(12) United States Patent
Nishimura et al.

(10) Patent No.: US 10,946,817 B2
(45) Date of Patent: Mar. 16, 2021

(54) WIRE HARNESS FIXING STRUCTURE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Housei Mizuno, Mie (JP); Satoshi Ujita, Mie (JP); Motohiro Yokoi, Mie (JP); Shigeki Ikeda, Mie (JP); Daisuke Ebata, Mie (JP); Haruka Nakano, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/641,854

(22) PCT Filed: Jun. 5, 2018

(86) PCT No.: PCT/JP2018/021528
§ 371 (c)(1),
(2) Date: Feb. 25, 2020

(87) PCT Pub. No.: WO2019/044098
PCT Pub. Date: Mar. 7, 2019

(65) Prior Publication Data
US 2020/0180527 A1    Jun. 11, 2020

(30) Foreign Application Priority Data
Sep. 4, 2017    (JP) .............................. JP2017-169187

(51) Int. Cl.
*B60R 16/02*      (2006.01)
*H01B 7/00*       (2006.01)
*H02G 3/32*       (2006.01)

(52) U.S. Cl.
CPC ....... *B60R 16/0215* (2013.01); *H01B 7/0045* (2013.01); *H02G 3/32* (2013.01)

(58) Field of Classification Search
CPC ............ B60R 16/0215; B60R 16/0207; H01B 13/012; H01B 7/40; H01B 7/0045; H02G 3/30; H02G 3/32
See application file for complete search history.

(56) References Cited

U.S. PATENT DOCUMENTS

| 2015/0321625 A1* | 11/2015 | Sato ......................... H02G 3/30 174/72 A |
| 2016/0046245 A1* | 2/2016 | Kajiwara ................. F16L 3/137 248/71 |

(Continued)

FOREIGN PATENT DOCUMENTS

| GB | 2 203 598 A | 10/1988 |
| JP | 63-166635 A | 7/1988 |

(Continued)

OTHER PUBLICATIONS

International Search Report issued in PCT/JP2018/021528, dated Aug. 7, 2018.

(Continued)

*Primary Examiner* — Timothy J Thompson
*Assistant Examiner* — Amol H Patel
(74) *Attorney, Agent, or Firm* — Greenblum & Bernstein, P.L.C.

(57) ABSTRACT

A wire harness fixing structure includes; a silencer disposed between a floor mat and a body in a vehicle; a wire harness disposed along a main surface of the silencer; and a fixing (Continued)

member fixing the wire harness to the silencer. A bottomed hole having a bottom is formed in the silencer to be concaved from the main surface in a thickness direction. The fixing member is locked to the bottomed hole, thereby fixing the wire harness to the silencer.

7 Claims, 7 Drawing Sheets

(56) References Cited

U.S. PATENT DOCUMENTS

2016/0121821 A1* 5/2016 Suzuki ............... B60R 16/0215
                                                   296/97.23
2017/0327060 A1* 11/2017 Nakajima ........ H01B 13/01254

FOREIGN PATENT DOCUMENTS

| JP | 63-176757 A |   | 7/1988 |
| JP | 64-67443 A |   | 3/1989 |
| JP | 2001-251742 A |   | 9/2001 |
| JP | 2006-347273 A |   | 12/2006 |
| JP | 2006347273 A | * | 12/2006 |
| JP | 2007-307920 A |   | 11/2007 |
| JP | 2007307920 A | * | 11/2007 |

OTHER PUBLICATIONS

International Preliminary Report on Patentability issued in PCT/JP2018/021528, dated Mar. 10, 2020.
Japan Official Action issued in Japanese Patent Application No. 2017-169187, dated Aug. 11, 2020, and English language translation.
Indian Office Action issued in Indian Application No. 202017007094, dated Oct. 26, 2020.

* cited by examiner

WIRE HARNESS FIXING STRUCTURE

TECHNICAL FIELD

The present invention relates to a technique of fixing a wire harness.

BACKGROUND ART

Patent Document 1 discloses a technique of embedding and fixing a wire harness to a urethane member (also referred to as a silencer, for example) embedded between a body in a bottom part of an automobile and a floor mat for purpose of acoustic insulation and flattening a concavo-convex shape, for example.

PRIOR ART DOCUMENTS

Patent Documents

Patent Document 1: Japanese Patent Application Laid-Open No. 63-166635

SUMMARY

Problem to be Solved by the Invention

However, in the technique described in Patent Document 1, the wire harness needs to be insert-molded as an insert component.

Thus, an object of the present invention is to provide a technique capable of easily fixing a wire harness, which is formed as a separated body, to a silencer.

Means to Solve the Problem

In order to solve the above problem, a wire harness fixing structure according to a first aspect includes; a silencer disposed between a floor mat and a body in a vehicle; a wire harness disposed along a main surface of the silencer; and a fixing member fixing the wire harness to the silencer, wherein a bottomed hole having a bottom is formed in the silencer to be concaved from the main surface in a thickness direction, and the fixing member is locked to the bottomed hole, thereby fixing the wire harness to the silencer.

The wire harness fixing structure according to a second aspect is the wire harness fixing structure according to the first aspect, wherein the silencer includes a silencer body part and a locking member which is formed of a material having higher rigidity than the silencer body part, is provided to be integral with the silencer body part, and has the bottomed hole.

The wire harness fixing structure according to a third aspect is the wire harness fixing structure according to the second aspect, wherein a locking protrusion part is formed in both the fixing member and the locking member so as to be locked to each other.

The wire harness fixing structure according to a fourth aspect is the wire harness fixing structure according to the second or third aspect, wherein the locking member includes: a shaft extending from one end portion exposed to a side of the main surface of the silencer body part toward an inner side of the silencer body part and having the bottomed hole; and a retaining part linking to another end portion of the shaft to prevent the shaft from getting out of the silencer body part, and the fixing member has an insertion part formed into a rod-like shape to be inserted into and locked to the bottomed hole formed in the shaft and an insertion regulating part formed on a base end of the insertion part to regulate a further insertion of the insertion part into the bottomed hole.

The wire harness fixing structure according to a fifth aspect is the wire harness fixing structure according to the fourth aspect, wherein the fixing member further has a harness fixing part which is provided to extend from the insertion regulating part and to which the wire harness is fixed.

The wire harness fixing structure according to a sixth aspect is the wire harness fixing structure according to any one of the first to fifth aspects, wherein the fixing member includes a clip with a supporting column part and a locking piece formed on a tip of the supporting column part so as to be able to be inserted into and locked to a hole, and the locking piece of the clip is locked to the bottomed hole formed in the silencer body part.

The wire harness fixing structure according to a seventh aspect is the wire harness fixing structure according to any one of the first to sixth aspects, wherein the wire harness includes an electrical wire and a sheet material which the electrical wire is fixed to and which is sandwiched between the fixing member and the silencer.

The wire harness fixing structure according to an eighth aspect is the wire harness fixing structure according to any one of the first to seventh aspects, wherein the wire harness includes a plurality of electrical wires bundled into a circular shape in cross section and is fixed to the fixing member by a banding member.

Effects of the Invention

According to the first to eighth aspects, the wire harness formed as a separated body can be easily fixed to the silencer by the fixing member. At this time, the hole formed in the silencer for locking the fixing member is the bottomed hole, thus reduction in acoustic insulation due to the formation of the hole can be suppressed.

Particularly, according to the second aspect, a locking state is stabilized compared to a case where the fixing member is directly locked to the silencer body part.

Particularly, according to the third aspect, the locking state of the fixing member and the locking member becomes more stable.

Particularly, according to the fourth aspect, the locking member hardly gets out of the silencer body part. The excess insertion of the fixing member into the locking member can be suppressed.

Particularly, according to the fifth aspect, the fixing member can be previously fixed to the wire harness. The fixing member which has been fixed to the wire harness can be easily locked to the silencer.

Particularly, according to the sixth aspect, the wire harness can be fixed using the clip. At this time, the clip is locked to the bottomed hole, thus it is possible to suppress a protrusion of the clip to an outer side of the main surface located on the opposite side of the main surface, on which the wire harness is disposed, of the silencer.

Particularly, according to the seventh aspect, the fixing member and the silencer sandwich the portion of the sheet material, thereby being able to fix the wire harness easily.

Particularly, according to the eighth aspect, the wire harness having the circular cross section can be fixed to the silencer.

DESCRIPTION OF EMBODIMENT(S)

First Embodiment

Figure 1:
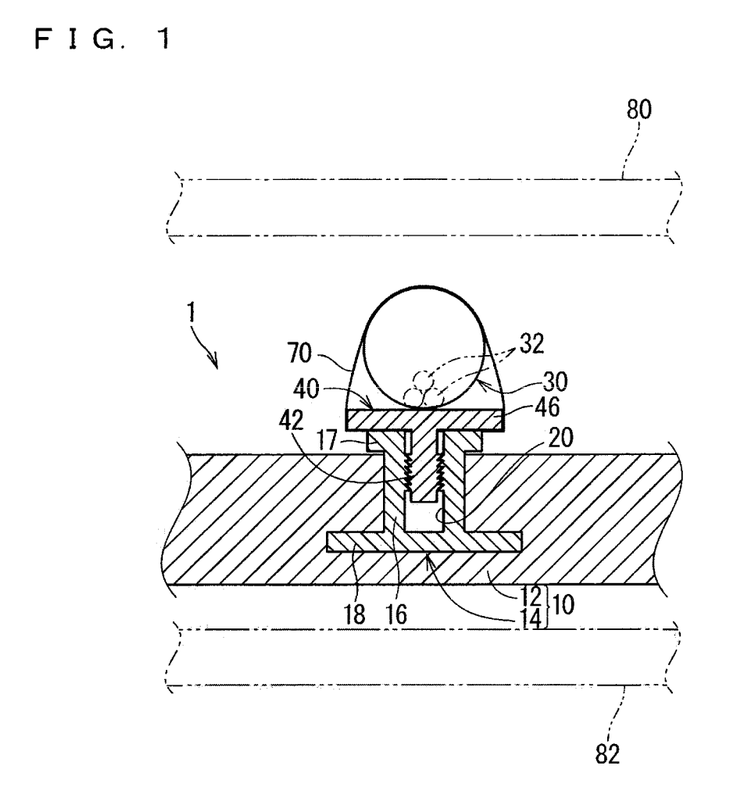
FIG. 1 A schematic cross-sectional view illustrating a wire harness fixing structure according to a first embodiment.
Figure 2:
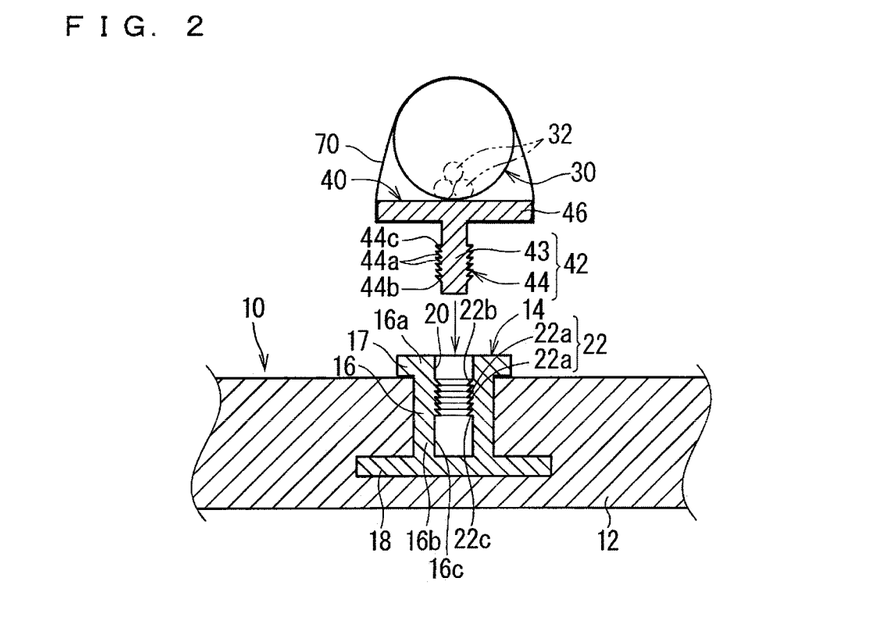
FIG. 2 A schematic exploded cross-sectional view illustrating the wire harness fixing structure according to the first embodiment.
Figure 3:
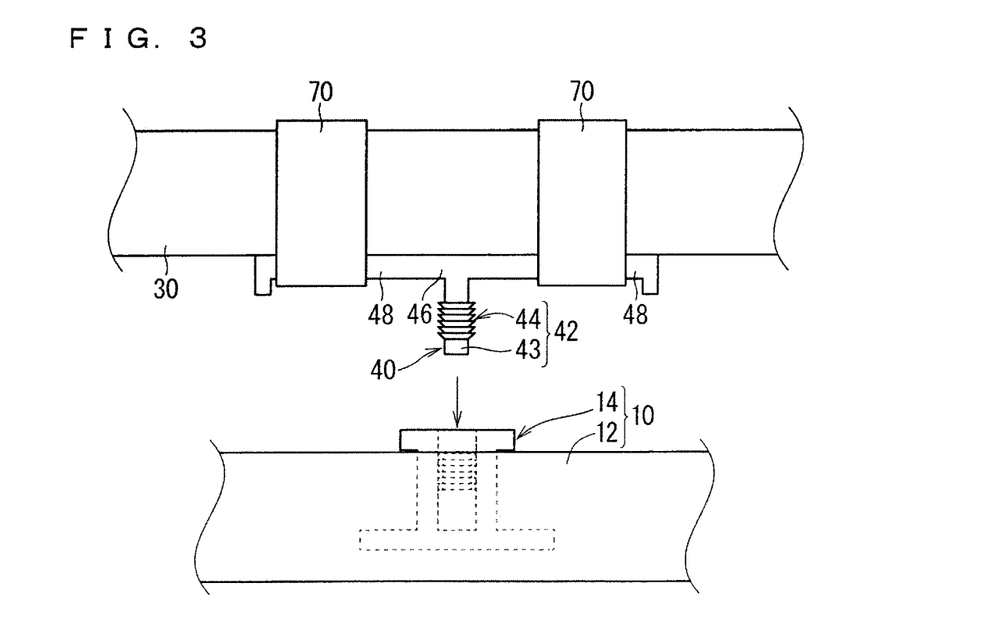
FIG. 3 An exploded side view illustrating the wire harness fixing structure according to the first embodiment.

A wire harness fixing structure according to a first embodiment is described hereinafter. FIG. 1 is a schematic cross-sectional view illustrating a wire harness fixing structure 1 according to the first embodiment. FIG. 2 is a schematic exploded cross-sectional view illustrating the wire harness fixing structure 1 according to the first embodiment. FIG. 3 is an exploded side view illustrating the wire harness fixing structure 1 according to the first embodiment.

The wire harness fixing structure 1 includes a silencer 10, a wire harness 30 disposed along a main surface of the silencer 10, and a fixing member 40 fixing the wire harness 30 to the silencer 10.

The silencer 10 is a member disposed between a floor mat 80 and a body 82 in a vehicle. A bottomed hole 20 having a bottom is formed to be concaved from a main surface, where the wire harness 30 is disposed, of the silencer 10 in a thickness direction. Specifically, the silencer 10 includes a silencer body 12 and a locking member 14. In the description herein, the bottomed hole 20 is formed in the locking member 14.

The silencer body 12 is formed into a plate-like shape by a material having acoustic insulation properties. In the description herein, the silencer body 12 is formed by mixing a chip of a resin foam such as foamed polyurethane with an adhesive agent (binder) applied to the chip and then compressing and integrally fixing them under vapor atmosphere. A known adhesive agent, such as a urethane chip adhesive agent, according to a material of the chip can be applied as the adhesive agent. A method of manufacturing the silencer body part 12 is not limited thereto described above. For example, the silencer body part 12 may be formed by foaming a resin material such as polyurethane and performing mold forming on the resin material. For example, the silencer body part 12 is formed of numberless compressed fibrous members. In this case, the numberless fibrous members may be entangled with and bonded to each other, or may also be fixed by an adhesive agent, for example. The fibrous members may be made up of natural fiber or chemical fiber. In the example illustrated in FIG. 1, the silencer body part 12 is flatly formed, but may have a portion with concave and convex in a thickness direction for purpose of following a shape of the floor mat 80 or the body 82 or partially adding a volume of the silencer 10.

The locking member 14 is made of a material, such as a non-foam resin, having higher rigidity than the silencer body part 12, for example. The locking member 14 is provided to be integral with the silencer body part 12. Specifically, the locking member 14 includes a shaft 16 and a retaining part 18. The bottomed hole 20 is formed in the locking member 14. A locking protrusion part 22 is further formed in the locking member 14 herein. The locking protrusion part 22 and a locking protrusion part 44 described hereinafter in the fixing member 40 are locked to each other.

The shaft 16 is formed into a rod-like shape. On end portion 16a of the shaft 16 is exposed to a main surface side, where the wire harness 30 is disposed, of the silencer body part 12. The shaft 16 extends from the one end portion 16a exposed to the main surface side of the silencer body part 12 toward an inner side of the silencer body part 12. The shaft 16 is formed into a cylindrical shape with both ends thereof opened.

A tip of the one end portion 16a of the shaft 16 protrudes outside the main surface of the silencer body part 12. A flange part 17 is provided on a peripheral edge of the protrusion part. The protrusion part and the flange part 17 are parts held by a mold 90 when the silencer 10 is insert-molded, using the locking member 14 as an insert component. There may also be a case where the protrusion part and the flange part 17 are not provided.

The retaining part 18 is a part preventing the shaft 16 from getting out of the silencer body part 12. Specifically, the retaining part 18 links to the other end portion 16b of the shaft 16. The retaining part 18 is formed larger than the shaft 16. The retaining part 18 is formed into a plate-like shape such as a disc-like shape or a rectangular plate-like shape, for example. An outward main surface of the retaining part 18 is covered by the silencer body part 12.

The bottomed hole 20 is made up of the shaft 16 and the retaining part 18 herein. More specifically, a hollow part 16c inside the cylindrical shaft 16 constitutes a hole part of the bottomed hole 20. At this time, an opening of the hollow part 16c in the other end portion 16b in the shaft 16 is closed by the retaining part 18. Accordingly, the retaining part 18 constitutes a bottom part of the bottomed hole 20 herein. At this time, the one end portion 16a of the shaft 16 is exposed to the main surface side of the silencer body part 12, thus the opening of the hollow part 16c in the one end portion 16a in the shaft 16 is exposed outside, and forms the opening of the bottomed hole 20. Then, the fixing member 40 is inserted from the opening.

There may also be a case where a through hole linking to the hollow part 16c in the shaft 16 is formed in the retaining part 18. In this case, a portion located on an opposite side of the main surface, on which the wire harness 30 is disposed, on a locking member 14 side of the silencer body part 12 constitutes the bottom part of the bottomed hole 20. Also considered is that the shaft 16 is formed into a cylindrical shape in which the other end portion 16b is closed, for example, thus the bottom part of the bottomed hole 20 is located in a middle portion in the shaft 16.

The locking protrusion part 22 is formed to protrude inward from an inner peripheral surface of the shaft 16. The locking protrusion part 22 includes at least one protrusion 22a (herein, a plurality of protrusions 22a). The protrusion 22a is formed so that a protrusion dimension gradually increases from an opening side toward a bottom side of the bottomed hole 20. More specifically, the protrusion 22a has an inclined surface 22b inclined with respect to an axial direction and a vertical surface 22c perpendicular to the axial direction. In the protrusion 22a, the inclined surface 22b is directed to the opening side of the bottomed hole 20, and the vertical surface 22c is directed to the bottom side of the bottomed hole 20. The plurality of the protrusions 22a are formed side by side in the axial direction. The protrusion 22a is formed over a whole circumferential direction. The protrusion 22a may also be formed only in part of a region along the circumferential direction. In this case, also considered is that a plurality of protrusions each having a dimension along the circumferential direction smaller than a half of the periphery are arranged in the circumferential direction.

The locking member 14 is considered an integrated molded component made of resin using a mold, for example.

Figure 4:
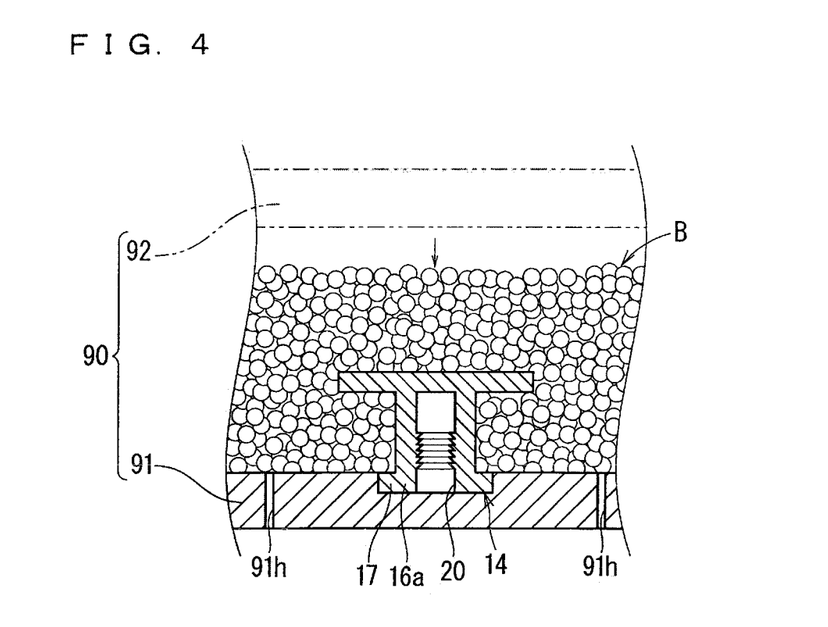
FIG. 4 A schematic diagram for explaining a manufacture of a silencer.

FIG. 4 is a schematic diagram for explaining a manufacture of the silencer 10.

The silencer 10 described above can be formed by insert molding, using the locking member 14 which is a molded component as an insert component, for example. At this time, as illustrated in FIG. 4, an adulterant B which is a mixture of a chip and an adhesive agent is put in a lower mold 91 in the mold 90 while the lower mold 91 holds a protrusion part of the shaft 16 and the flange part 17. Accordingly, an intrusion of the material constituting the silencer body part 12 into the bottomed hole 20 can be suppressed. In this state, an upper mold 92 is moved close to the lower mold 91 while applying vapor into the mold 90, thereby compressing the adulterant. Accordingly, the adhesive agent is hardened with the chip being compressed, and the adulterant is formed into a shape of molded component. The vapor is introduced in the lower mold 91 through an air hole 91h formed in the lower mold 91, for example. When the resin is foamed and molded to manufacture the silencer, the silencer can also be formed by two-color molding (also referred to as double molding, for example) besides the insert molding.

The silencer body part 12 and the locking member 14 are preferably bonded by a resin in integrally molding the silencer 10. Accordingly, the silencer body part 12 and the locking member 14 are hardly loosened. The resin is considered part of the resin constituting the silencer body part 12, for example. Specifically, when the adulterant B of the chip and the adhesive agent is compressed under the vapor atmosphere to form the silencer body part 12 as described above, it is considered that the adhesive agent contained in the adulterant B is also bonded to the locking member 14.

The wire harness 30 includes a plurality of electrical wires 32. Herein, the plurality of electrical wires 32 are bundled into a circular shape in cross section. A banding member such as an adhesive tape or a banding band not shown in the drawings, for example, is wound around the plurality of electrical wires 32, thus the plurality of electrical wires 22 are bundled into the circular shape in cross section. The adhesive tape is spirally wound or partially wound at intervals, for example. For example, a tubular member such as a corrugated tube is externally mounted on the plurality of electrical wires 32, or a sheet material is wound around the plurality of electrical wires 32, thus the plurality of electrical wires 32 are bundled into the circular shape in cross section.

The banding member 70 is wound around the wire harness 30 with a harness fixing part 48 described hereinafter in the fixing member 40, thus the wire harness 30 is fixed to the harness fixing part 48. An adhesive tape or a banding band, for example, is considered as the banding member 70. In the description herein, the adhesive tape is adopted as the banding member 70.

The banding member 70 fixing the wire harness 30 to the harness fixing part 48 doubles as a function as the banding member bundling the plurality of electrical wires 32 into the circular shape in cross section. In this case, it is also considered that in the part of the wire harness 30 fixed to the harness fixing part 48, the part where the adhesive tape is spirally wound is omitted.

In the example illustrated in FIG. 1, the wire harness 30 is disposed on the main surface, which faces a floor mat 80 side, of the silencer 10, however, this configuration is not necessary. There may also be a case where the wire harness 30 is disposed on a main surface, which faces a body 82 side, of the silencer 10.

The fixing member 40 is locked to the bottomed hole 20, thereby fixing the wire harness 30 to the silencer 10. Specifically, the fixing member 40 includes an insertion part 42 and an insertion regulating part 46. Herein, the fixing member 40 further includes the harness fixing part 48. Herein, the locking protrusion part 44 is formed in the fixing member 40. The locking protrusion part 44 and the locking protrusion part 22 formed in the locking member 14 are locked to each other.

The insertion part 42 is formed into a rod-like shape. The insertion part 42 is inserted into and locked to the bottomed hole 20 formed in the shaft 16. The insertion part 42 includes an insertion body part 43 and the locking protrusion part 44.

The insertion body part 43 is formed into a rod-like shape equal to or smaller (slightly smaller herein) than the bottomed hole 20. Herein, the insertion body part 43 is formed into a column-like shape (a circular column-like shape herein). The insertion body part 43 may be formed into a cylindrical shape. The insertion body part 43 may be divided along a planar surface parallel to the extension direction so as to be elastically deformed easily. In this case, a configuration of division is not particularly limited, however, the insertion body part 43 may be divided into two, three, four, or more.

The locking protrusion part 44 is formed to protrude outward from an outer peripheral surface of the insertion body part 43. The locking protrusion part 44 includes at least one protrusion 44a (herein, a plurality of protrusions 44a). The protrusion 44a is formed so that a protrusion dimension gradually increases from a tip side toward a base end side of the insertion body part 43. Herein, the protrusion 44a has an inclined surface 44b inclined with respect to the axial direction and a vertical surface 44c perpendicular to the axial direction. The protrusion 44a directs the inclined surface 44b toward the tip side and directs the vertical surface 44c toward the base end side. The plurality of the protrusions 44a are formed side by side in the axial direction. The protrusion 44a is formed over a whole circumferential direction. The protrusion 44a may also be formed only in part of a region along the circumferential direction. In this case, also considered is that a plurality of protrusions each having a dimension along the circumferential direction smaller than a half of the periphery are arranged in the circumferential direction.

The insertion regulating part 46 is formed on a base end of the insertion part 42. The insertion regulating part 46 regulates a further insertion of the insertion part 42 into the bottomed hole 20. The insertion regulating part 46 is formed into a plate-like shape larger than the insertion body part 43. At this time, the insertion regulating part 46 is formed into a plate-like shape larger than the bottomed hole 20. Accordingly, the insertion regulating part 46 cannot be inserted into the bottomed hole 20. Herein, the insertion regulating part 46 is formed into a rectangular plate-like shape. The harness fixing part 48 is provided in a state of extending from the insertion regulating part 46.

A configuration of locking the bottomed hole 20 and the insertion part 42 is described herein.

When the insertion body part 43 is inserted into the bottomed hole 20, the inclined surfaces 22b and 44b of the protrusions 22a and 44a come in contact with each other in due course. When power is continuously applied, the protrusions 22a and 44a being in contact with each other are elastically deformed and guide each other to a far side in an insertion direction. Accordingly, the insertion part 42 is inserted into the bottomed hole 20. When the insertion regulating part 46 comes in direct contact with an opening peripheral edge (the tip of the shaft 16) of the bottomed hole 20, the insertion part 46 cannot be further inserted, and the insertion is completed. In the meanwhile, when power is applied to the insertion part 42 inserted into and locked to the bottomed hole 20 in a direction of pulling the insertion part 42 out of the bottomed hole 20, the vertical surfaces 22c and 44c of the protrusions 22a and 44a are contact with each other, thus the protrusions 22a and 44a are hardly elastically deformed. Accordingly, it is difficult to pull out the insertion part 42 inserted into and locked to the bottomed hole 20.

Preferably applied is at least one of a configuration that there is no protrusion 22a on the tip of the shaft 16 and a configuration that there is no protrusion 44a on the tip of the insertion body part 43. Thus, a contact of the protrusions 22a and 44a immediately after the insertion of the insertion part 42 into the bottomed hole 20 can be suppressed. As a result, the process of applying the power for elastically deforming the protrusions 22a and 44a can be performed after the insertion part 42 is inserted into the bottomed hole 20 to some degree, thus the power for elastically deforming the protrusions 22a and 44a can be easily applied along the axial direction, and the insertion part 42 can be easily inserted into the bottomed hole 20. Applied herein are both the configuration that there is no protrusion 22a on the tip of the shaft 16 and the configuration that there is no protrusion 44a on the tip of the insertion body part 43. Accordingly, a dimension of inserting the insertion part 42 until the protrusions 22a and 44a come in contact with each other can be increased.

The harness fixing part 48 is a part fixing the wire harness 30. Herein, part of the insertion regulating part 46 extends in a direction intersecting with an extension direction of the insertion part 42, and the extended part constitutes the harness fixing part 48. The adhesive tape as the banding member 70 is wound around the harness fixing part 48 and the wire harness 30, thus the wire harness 30 is fixed to the harness fixing part 48.

Herein, the two harness fixing parts 48 are provided to extend to the both sides of the insertion regulating part 46 in the example illustrated in FIG. 3, however, this configuration is not necessary. For example, only one harness fixing part 48 may be provided to extend to only one side of the insertion regulating part 46.

The harness fixing part 48 is also considered to be connected to the insertion regulating part 46 via an offset part. The offset part is a part shifting positions of the harness fixing part 48 and the insertion part 42 viewed from the extension direction of the insertion part 42, for example. For example, the offset part is provided to extend in a first direction intersecting with the extension direction of the insertion part 42 on the insertion regulating part 46. At this time, the harness fixing part 48 is provided on a tip side of the offset part to extend in a second direction intersecting with the first direction, in which the offset part extends, on the offset part.

The fixing member 40 is considered an integrated molded component made of resin using a mold, for example. At this time, the fixing member 40 is considered to have higher rigidity than the silencer body part 12.

According to the configuration described above, the wire harness 30 formed as a separated body can be easily fixed to the silencer 10 by the fixing member 40. At this time, the hole formed in the silencer 10 for locking the fixing member 40 is the bottomed hole 20, thus reduction in acoustic insulation due to the formation of the hole can be suppressed. Particularly, a through hole is not formed in the silencer body part 12 herein, thus the reduction in the acoustic insulation can be suppressed more reliably.

The bottomed hole 20 is provided in the locking member 14, thus a locking state is stabilized compared to a case where the fixing member 40 is directly locked to the silencer body part 12.

The locking protrusion parts 22 and 44 are provided in both the locking member 14 and the fixing member 40, respectively, thus the locking state of the locking member 14 and the fixing member 40 becomes more stable.

The retaining part 18 is provided in the locking member 14, thus the locking member 14 hardly gets out of the silencer body part 12. The insertion regulating part 46 is provided in the fixing member 40, thus the excess insertion of the fixing member 40 into the locking member 14 can be suppressed.

The harness fixing part 48 is provided in the fixing member 40, thus the fixing member 40 can be previously fixed to the wire harness 30. The fixing member 40 which has been fixed to the wire harness 30 can be easily locked to the silencer 10.

The wire harness 30 having the circular cross section can be fixed to the silencer 10. It is hard to sandwich and fix a large sheet such as the silencer 10 from both sides, however, even in such a case, an attaching operation can be completed by an operation only on one surface.

Second Embodiment

Figure 5:
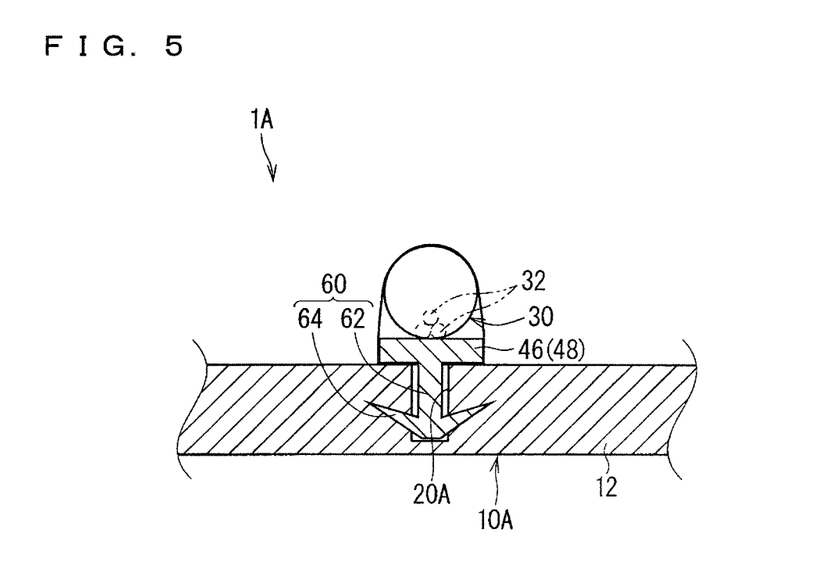
FIG. 5 A schematic cross-sectional view illustrating a wire harness fixing structure according to a second embodiment.
Figure 6:
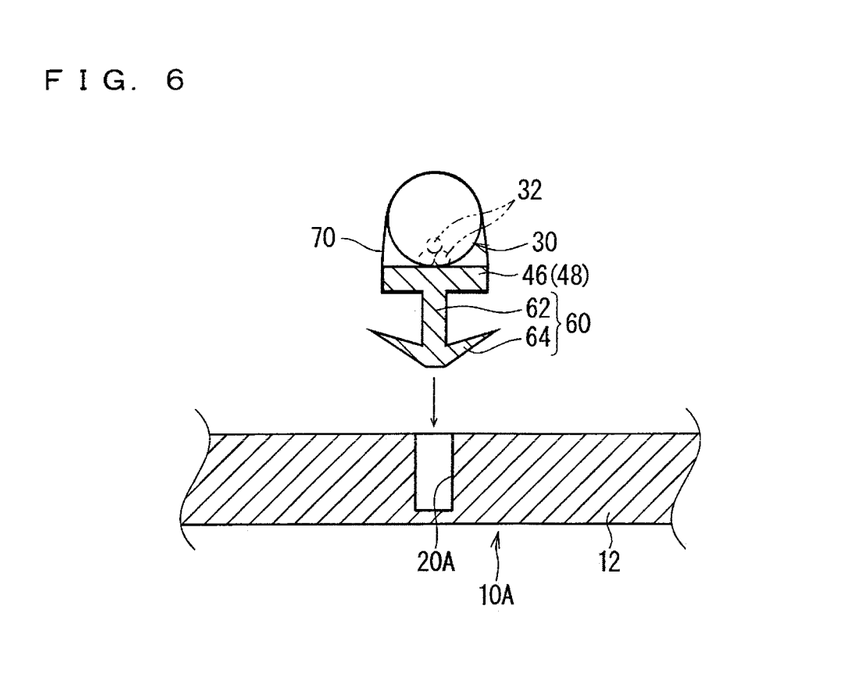
FIG. 6 A schematic exploded cross-sectional view illustrating the wire harness fixing structure according to the second embodiment.

A wire harness fixing structure according to a second embodiment is described. FIG. 5 is a schematic cross-sectional view illustrating a wire harness fixing structure 1A according to the second embodiment. FIG. 6 is a schematic exploded cross-sectional view illustrating the wire harness fixing structure 1A according to the second embodiment. In the description of the present embodiment, the same reference numerals are assigned to the similar constituent elements described above, and the description thereof will be omitted.

In the wire harness fixing structure 1A according to the present embodiment, a shape of a fixing member 40A is different from that of the fixing member 40 in the wire harness fixing structure 1 according to the first embodiment. Furthermore, the locking member 14 is omitted in a silencer 10A according to the present embodiment.

Specifically, a clip 60 is used as the fixing member 40A herein. The clip 60 is inserted into and locked to a bottomed hole 20A formed in the silencer body part 12. More specifically, the clip 60 has a supporting column part 62 and a locking piece 64. The clip 60 also has the insertion regulating part 46 and the harness fixing part 48 in the manner similar to the fixing member 40 described above.

The supporting column part 62 is formed equal to or smaller (slightly smaller herein) than the bottomed hole 20A. The insertion regulating part 46 is provided on a base end of the supporting column part 62, and the insertion regulating part 46 extends to form the harness fixing part 48.

The locking piece 64 is provided on a tip of the supporting column part 62. The locking piece 64 is formed larger than the bottomed hole 20A. The locking piece 64 is locked to the bottomed hole 20A formed in the silencer body part 12. The locking piece 64 is formed into a shape gradually spreading outward toward the base end of the supporting column part 62. Herein, the two locking pieces 64 are formed to protrude to both sides of the supporting column part 62.

The clip 60 is considered an integrated molded component made of resin using a mold, for example.

In the description herein, the clip 60 is formed of a material having higher rigidity than the silencer body part 12. In this case, when the clip 60 is inserted into the bottomed hole 20A, mainly the silencer body part 12 is elastically deformed. That is to say, the silencer body part 12 is elastically deformed so that the bottomed hole 20A is equal to or larger than the locking piece 64. At this time, the locking piece 64 may be formed to be elastically deformed easily to be small, or also may be formed to be hardly elastically deformed.

In the example illustrated in FIG. 5, the tip of the locking piece 64 breaks through an inner peripheral surface of the bottomed hole 20A to reach an inner side of the silencer body part 12. There may also be a case where the tip of the locking piece 64 does not break through the inner peripheral surface of the bottomed hole 20A. In this case, it is considered that the inner peripheral surface of the bottomed hole 20A is pressed by the tip of the locking piece 64, thus part of the bottomed hole 20A where the tip of the locking piece 64 is located is widened to an outer periphery side compared with part thereof located nearer the opening side.

According to the present embodiment, the wire harness 30 can be fixed using the clip 60. At this time, the clip 60 is locked to the bottomed hole 20A, thus it is possible to suppress a protrusion of the clip 60 to an outer side of the main surface located on the opposite side of the main surface, on which the wire harness 30 is disposed, of the silencer 10A.

At this time, the bottomed hole 20A for locking the clip 60 can be provided in an optional position in a base material of the molded silencer body part 12, thus a common component can be used as the base material of the silencer body part 12 before the bottomed hole is formed even when a position of locking the clip 60 is changed in accordance with a design change, for example. The number of components can be reduced compared to the wire harness fixing structure 1 according to the first embodiment. The integrated molding of the silencer body part 12 and the locking member 14 is unnecessary, thus the silencer 10A can be easily formed. According to these configurations, a cost can be kept low.

Modification Example

Figure 7:
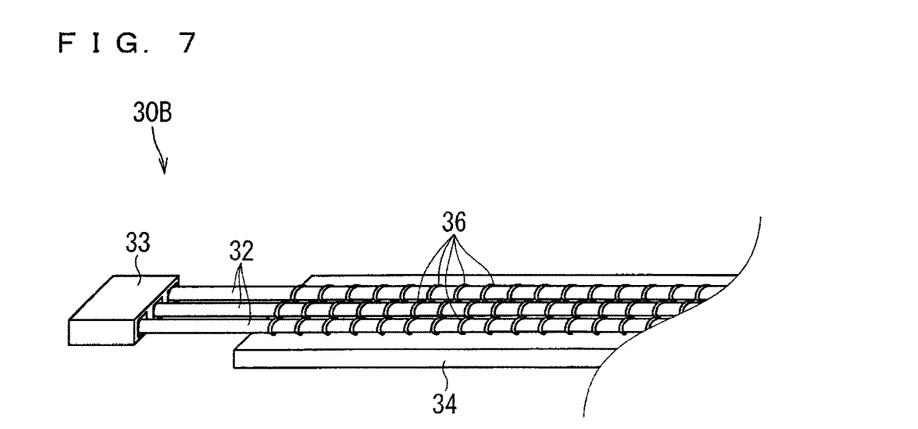
FIG. 7 A perspective view illustrating a wire harness according to a modification example.
Figure 8:
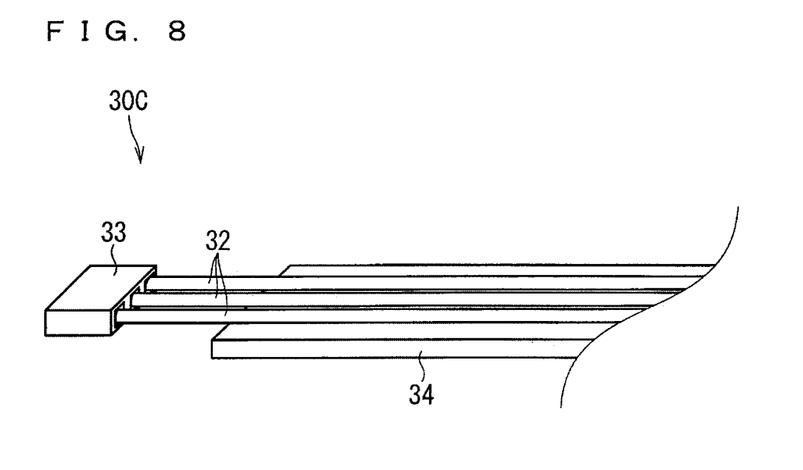
FIG. 8 A perspective view illustrating a wire harness according to another modification example.

FIG. 7 is a perspective view illustrating a wire harness 30B according to a modification example. FIG. 8 is a perspective view illustrating a wire harness 30C according to another modification example.

The wire harnesses 30B and 30C are different from the wire harness 30 according to the embodiment in that they are flatly formed. Herein, the electrical wires 32 are fixed to a sheet material 34, thus the wire harnesses 30B and 30C are flatly formed. A material constituting the sheet material 34 is not particularly limited, but a resin, metal, and a natural fiber can be applied. The sheet material 34 may have a uniform filled cross section by extrusion molding, for example. The sheet material 34 may be a woven cloth, a knitted cloth, or a non-woven cloth, for example. The electrical wire 32 may be an insulating wire having a core wire and the insulating covering formed around the core wire or a so-called bare wire made up only of the core wire. The core wire may be a single core wire or a stranded wire. The wire harness may be flatly formed by a means separately from the sheet material 34 such as a flexible flat cable (FFC) in which a covering is integrally applied around a plurality of core wires extending in parallel with each other, for example. A method of fixing the electrical wire 32 and the sheet material 34 is different between the wire harness 30B and the wire harness 30C.

Specifically, the electrical wire 32 is sewn and fixed to the sheet material 34 by a thread 36 in the wire harness 30B. In this case, the electrical wire 32 can be sewn to the sheet material 34 using a sewing machine. At this time, a needle thread and a bobbin thread as a machine-sewing thread 36 may be provided separately from the electrical wire 32, or the electrical wire 32 may be used as one of the needle thread and the bobbin thread as the machine-sewing thread 36. Needless to say, the electrical wire 32 may be sewn by hand.

The electrical wire 32 is welded and fixed to the sheet material 34 in the wire harness 30C. In this case, the covering of the electrical wire 32 is preferably welded to the sheet material 34. For example, an ultrasonic welding, a laser welding, and a thermal welding can be adopted as the welding method.

The electrical wire 32 is not necessarily fixed to the sheet material 34 by sewing or welding. The electrical wire 32 may be fixed to the sheet material 34 by a means other than the sewing and the welding. Also considered is that the electrical wire 32 and the sheet material 34 are fixed to each other by an adhesive agent and a double-sided tape, for example.

The plurality of electrical wires 32 are flatly disposed in the wire harnesses 30B and 30C, however, this configuration is not necessary. For example, the plurality of electrical wires 32 may be in a bundle state. A connector 33 is provided on the end portion of the electrical wire 32 while the end portion of the electrical wire 32 extends from the sheet material 34, however, this configuration is not necessary. For example, the connector 33 may be provided in a position overlapping with the sheet material 34.

Figure 9:
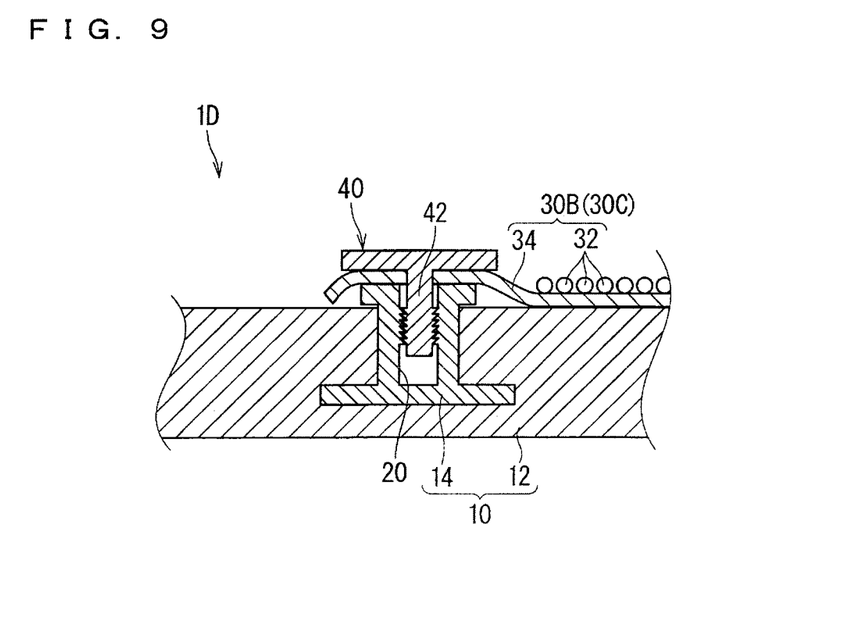
FIG. 9 A schematic cross-sectional view illustrating a modification example of the wire harness fixing structure according to the first embodiment.
Figure 10:
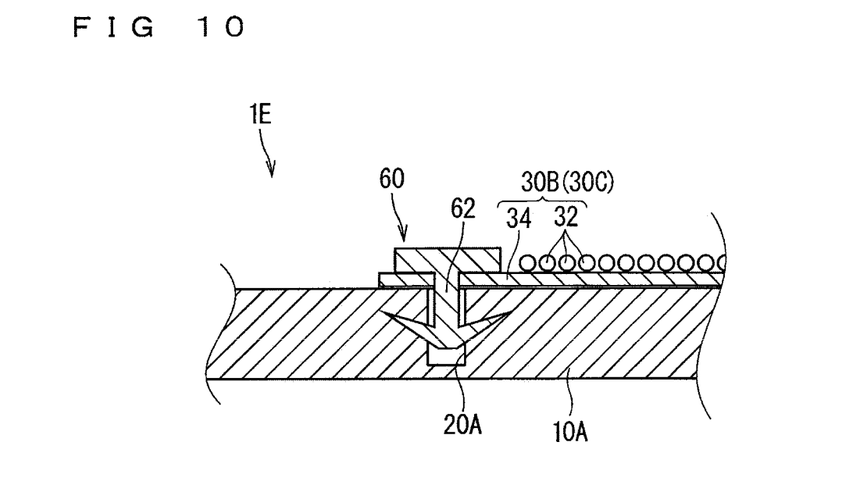
FIG. 10 A schematic cross-sectional view illustrating a modification example of the wire harness fixing structure according to the second embodiment.

FIG. 9 is a schematic cross-sectional view illustrating a modification example of the wire harness fixing structure 1 according to the first embodiment. FIG. 10 is a schematic cross-sectional view illustrating a modification example of the wire harness fixing structure 1A according to the second embodiment.

The examples illustrated in FIG. 9 and FIG. 10 illustrate wire harness fixing structures 1D and 1E using the wire harness 30B (30C) in which the electrical wire 32 is fixed to the sheet material 34. For example, in the example illustrated in FIG. 9, the sheet material 34 is sandwiched between the fixing member 40 and the silencer 10, thus the wire harness 30B (30C) is fixed to the silencer 10. Particularly, herein, the insertion part 42 passes through the sheet material 34. In this case, it is also applicable that the fixing member 40 is previously attached to the sheet material 34 in the wire harness 30B (30C), and the wire harness 30B (30C) to which the fixing member 40 is attached is transported to an assembly plant to fix the wire harness 30B (30C) to the silencer 10. The same applies to the example illustrated in FIG. 10. The harness fixing part 48 described above for winding the banding member 70 in the fixing member 40 and the clip 60 may be or may not be omitted. When the harness fixing part 48 is not omitted, the harness fixing part 48 described above may be fixed to the sheet material 34, for example. Applicable as the method of fixing the harness fixing part 48 and the sheet material 34 is that part of the sheet material 34 is wound around the harness fixing part 48 or direct contact surfaces are joined to each other by an adhesive agent or a double-sided tape or a means such as welding, for example.

According to the embodiment described above, the fixing member 40 and the silencer 10 sandwich the portion of the sheet material 34, thereby being able to fix the wire harness 30B (30C) easily.

Figure 11:
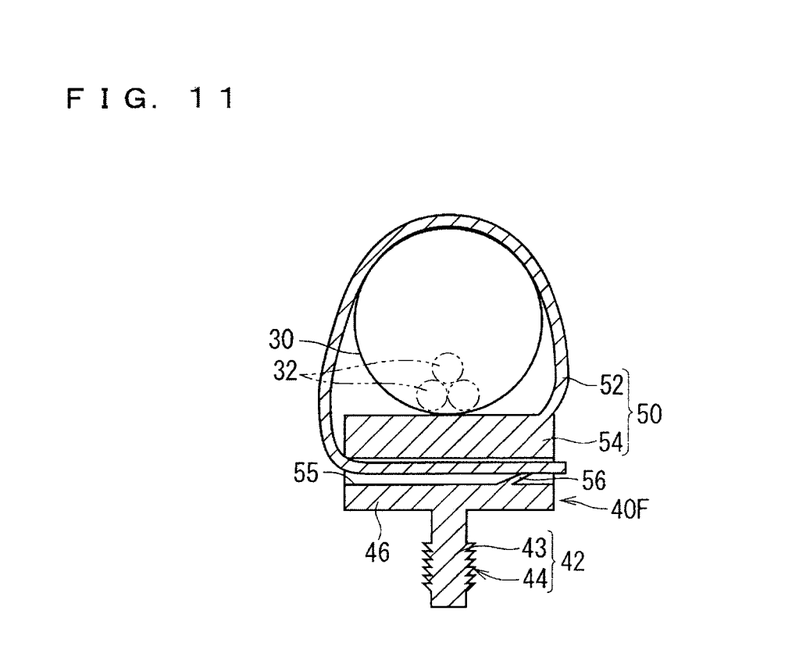
FIG. 11 A schematic cross-sectional view illustrating a modification example of a harness fixing part.

FIG. 11 is a schematic cross-sectional view illustrating a modification example of the harness fixing part 48.

In the above description according to each embodiment, the harness fixing part 48 is formed into the plate-like shape and the banding member 70 formed as a separated body is wound around the harness fixing part 48 with the electrical wire 22 so that the electrical wire 32 and the fixing member are fixed to each other, however, this configuration is not necessary. For example, the fixing member and the banding member as the harness fixing part may be integrally molded. The example illustrated in FIG. 11 illustrates a fixing member 40F in which a banding band structure part 50 is adopted as such a harness fixing part. The fixing member 40F is an example that the banding band structure part 50 and the fixing member 40 according to the first embodiment are integrally molded.

The banding band structure part 50 includes a band part 52 and a band fixing part 54 linking to a base end of the band part 52. The band fixing part 54 can fix a tip of the band part 52 wound around a member to be bound. More specifically, the band fixing part 54 is formed into a rectangular parallelepiped shape. A band insertion hole 55 passing through a pair of main surfaces of the band fixing part 54 is formed in the band fixing part 54. A locking protrusion piece 56 which can be selectively locked to a plurality of concave portions formed in the band part 52 protrudes from an inner peripheral surface of the band insertion hole 55.

In the fixing member 40F, the insertion part 42 described above in the fixing member 40 protrudes from a main surface other than a main surface from which the band part 52 protrudes with respect to the band fixing part 54. The side of the band fixing part 54 from which the insertion part 42 protrudes doubles as the insertion regulating part 46 described above. From another point of view, it can be interpreted that the banding band structure part 50 as the harness fixing part is formed in a state where the thin-walled insertion regulating part 46 extends in the thickness direction. Then, the wire harness 30 is fixed to the fixing member 40F by the banding band structure part 50 integrally molded with the insertion part 42. Obviously, the banding band structure part 50 may be provided to be integral with the clip 60 according to the second embodiment.

Figure 12:
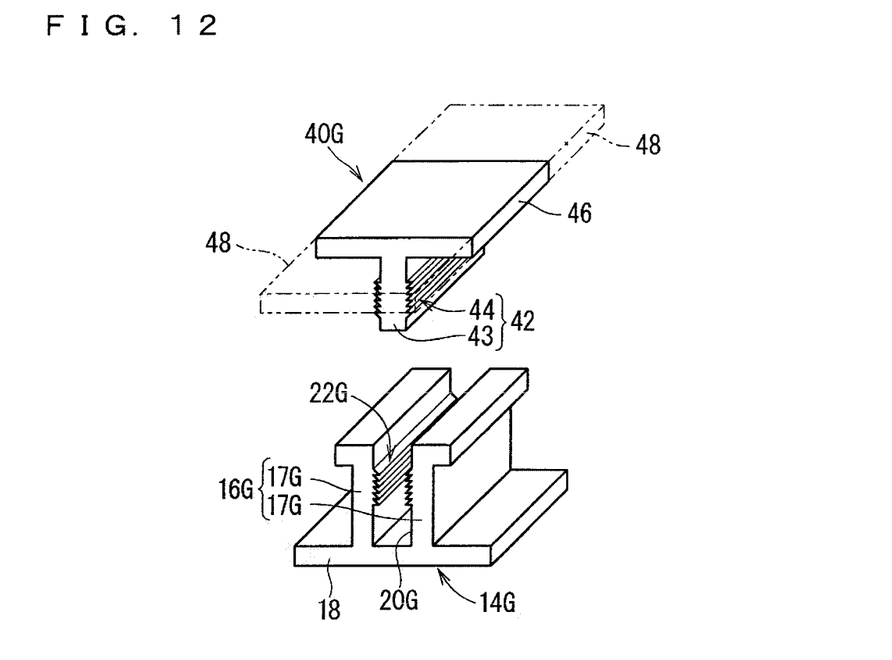
FIG. 12 A perspective view illustrating a modification example of a fixing member.

FIG. 12 is a perspective view illustrating a modification example of the locking member 14 and the fixing member 40.

In the description of the first embodiment, the shaft 16 is formed into the cylindrical shape, however, the shape of the shaft 16 is not limited thereto. For example, also applicable is a configuration that a plurality of flat plates 17G parallelly extending with a certain distance therebetween are formed to be a shaft 16G such as a locking member 14G illustrated in FIG. 12. In this case, a bottomed hole 20G is formed between the plurality of flat plates 17G. More specifically, in the example illustrated in FIG. 12, the two flat plates 17G each having a rectangular shape are formed to be the shaft 16G. At this time, a space between the two flat plates 17G each having the rectangular shape forms the bottomed hole 20G. In this case, part of the bottomed hole 20G in a circumferential direction (part which is not covered by the flat plate 17G) is covered by the silencer body part 12. A locking protrusion part 22G is formed on each main surface, which faces each other, of the two flat plates 17G.

In the example illustrated in FIG. 12, an insertion body part 43G in an insertion part 42G inserted into the bottomed hole 20G described above in a fixing member 40G is also formed into a rectangular flat plate-like shape. Then, a locking protrusion part 44G is formed to protrude outward on both main surfaces of the insertion body part 43G having the rectangular flat plate-like shape.

In the description according to the first embodiment, the silencer 10 including the locking member 14 is formed by the insert molding or the two-color molding, however, this configuration is not necessary. For example, it is also applicable that the silencer body part 12 is formed separately from the locking member 14, and the locking member 14 is afterward fitted in an attaching hole formed in the silencer body part 12.

In the description according to each embodiment, the silencer 10 is formed separately from the floor mat 80, however, this configuration is not necessary. There may also be a case where the silencer 10 is integral with the floor mat 80 by joining, for example. In this case, a member exposed to a vehicle interior in the integrated component is the floor mat.

Figure 13:
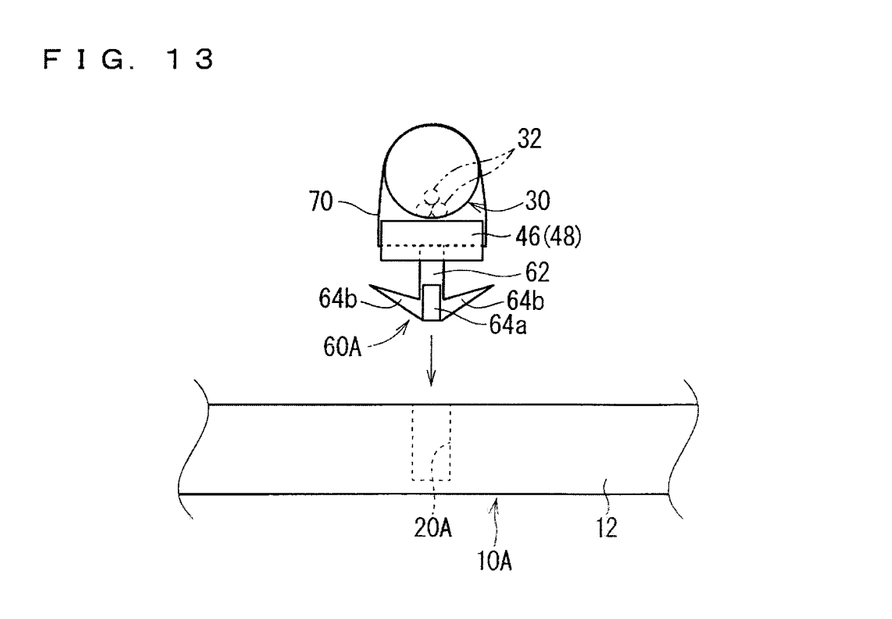
FIG. 13 A schematic side view illustrating a modification example of a locking piece.

FIG. 13 is a schematic side view illustrating a modification example of the locking piece 64.

In the above description of the second embodiment, the two locking pieces 64 are formed to protrude to the both sides of the supporting column part 62, however, the shape of the locking piece 64 is not limited thereto.

For example, in a clip 60A illustrated in FIG. 13, the four locking pieces 64 are formed to extend in four directions from the supporting column part 62. At this time, when the clip 60A is viewed from the extension direction of the supporting column part 62, a pair of locking parts 64a extend to sides opposite to each other from the supporting column part 62. In the similar manner, the other pair of locking parts 64b also extend to sides opposite to each other from the supporting column part 62. A direction in which the pair of locking parts 64a extend and a direction in which the pair of locking parts 64b extend intersect with (are perpendicular to) each other. Accordingly, in the clip 60A, the four locking parts 64 form a cross shape.

For example, the locking piece is also considered to be formed over the whole periphery of the supporting column part 62. In this case, the locking piece has a conical side surface-like (umbrella-like) shape.

The configurations described in the embodiments and modification examples thereof can be appropriately combined as long as they are not contradictory. For example, there may also be a case where the fixing member 40 and the clip 60 are locked to different positions in one silencer. For example, there may also be a case where one wire harness fixed to one silencer includes both the portion where the electrical wire is fixed to the sheet material and the portion where the electrical wires are bundled into the circular shape in cross section.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 1 wire harness fixing structure
10 silencer
12 silencer body part
14 locking member
16 shaft
18 retaining part
20 bottomed hole
22 locking protrusion part
30 wire harness
32 electrical wire
34 sheet material
40 fixing member
42 insertion part
43 insertion body part
44 locking protrusion part
46 insertion regulating part
48 harness fixing part
50 banding band structure part
52 band part
54 band fixing part
55 band insertion hole
56 locking protrusion piece
60 clip
62 supporting column part
64 locking piece
70 banding member
80 floor mat
82 body

The invention claimed is:

1. A wire harness fixing structure, comprising:
a silencer disposed between a floor mat and a body in a vehicle;
a wire harness disposed along a main surface of the silencer;
a fixing member fixing the wire harness to the silencer, wherein
a bottomed hole having a bottom is formed in the silencer to be concaved from the main surface in a thickness direction, and
the fixing member is locked to the bottomed hole, thereby fixing the wire harness to the silencer; wherein
the silencer includes a silencer body part and a locking member which is formed of a material having higher rigidity than the silencer body part,
the locking member being integral with the silencer body part, and the locking member having the bottomed hole, wherein a bottom wall of the locking member provides the bottom of the bottomed hole, and wherein
a surface of the bottom wall is covered with the silencer body part.

2. The wire harness fixing structure according to claim 1, wherein a locking protrusion part
is formed in both the fixing member and the locking member so as to be locked to each other.

3. The wire harness fixing structure according to claim 1, wherein
the fixing member includes a clip with a supporting column part and a locking piece formed on a tip of the supporting column part so as to be able to be inserted into and locked to a hole, and
the locking piece in the clip is locked to the bottomed hole formed in the silencer body part.

4. The wire harness fixing structure according to claim 1, wherein
the wire harness includes an electrical wire and a sheet material which the electrical wire is fixed to and which is sandwiched between the fixing member and the silencer.

5. The wire harness fixing structure according to claim 1, wherein
the wire harness includes a plurality of electrical wires bundled into a circular shape in cross section and is fixed to the fixing member by a banding member.

6. A wire harness fixing structure, comprising:
a silencer disposed between a floor mat and a body in a vehicle;
a wire harness disposed along a main surface of the silencer;
a fixing member fixing the wire harness to the silencer, wherein
a bottomed hole having a bottom is formed in the silencer to be concaved from the main surface in a thickness direction, and
the fixing member is locked to the bottomed hole, thereby fixing the wire harness to the silencer; and
the silencer includes a silencer body part and a locking member which is formed of a material having higher rigidity than the silencer body part,
the locking member being integral with the silencer body part, and the locking member having the bottomed hole, wherein
the locking member includes a shaft extending from one end portion exposed to a side of the main surface of the silencer body part toward an inner side of the silencer body part, the shaft having the bottomed hole formed therein and a retaining part linking to another end portion of the shaft to prevent the shaft from getting out of the silencer body part, and
the fixing member has an insertion part formed into a rod-like shape to be inserted into and locked to the bottomed hole formed in the shaft and an insertion regulating part formed on a base end of the insertion part to regulate a further insertion of the insertion part into the bottomed hole.

7. The wire harness fixing structure according to claim 6, wherein
the fixing member further has a harness fixing part which is provided to extend from the insertion regulating part and to which the wire harness is fixed.

* * * * *